US012614001B2

(12) United States Patent
Galles et al.

(10) Patent No.: US 12,614,001 B2
(45) Date of Patent: Apr. 28, 2026

(54) METHODS AND SYSTEMS FOR RUNNING SECURE PIPELINE TASKS AND INSECURE PIPELINE TASKS IN THE SAME HARDWARE ENTITIES

(71) Applicant: Pensando Systems Inc., Milpitas, CA (US)

(72) Inventors: Michael Brian Galles, Los Altos, CA (US); Francis Matus, Gainesville, GA (US); Anton Sabev, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 231 days.

(21) Appl. No.: 18/136,157

(22) Filed: Apr. 18, 2023

(65) Prior Publication Data

US 2024/0354447 A1 Oct. 24, 2024

(51) Int. Cl.
 *G06F 21/74* (2013.01)
 *G06F 21/54* (2013.01)
 *G06F 21/55* (2013.01)

(52) U.S. Cl.
 CPC .............. *G06F 21/74* (2013.01); *G06F 21/54* (2013.01); *G06F 21/556* (2013.01)

(58) Field of Classification Search
 USPC ........................................................ 726/26
 See application file for complete search history.

(56) References Cited

U.S. PATENT DOCUMENTS

| | | | |
|---|---|---|---|
| 8,375,145 B2 | 2/2013 | Kagan et al. | |
| 9,069,485 B2 | 6/2015 | Manula et al. | |
| 10,686,605 B2 * | 6/2020 | Chhabra | G06F 21/6209 |
| 11,132,204 B2 | 9/2021 | McCrary | |
| 2004/0210764 A1 * | 10/2004 | McGrath | G06F 9/4403 |
| | | | 713/190 |
| 2010/0017893 A1 * | 1/2010 | Foley | G06F 21/74 |
| | | | 726/34 |
| 2023/0224261 A1 * | 7/2023 | Pope | G06F 13/4022 |
| | | | 370/392 |

FOREIGN PATENT DOCUMENTS

| | | | | |
|---|---|---|---|---|
| EP | 3191994 B1 * | 11/2019 | | G06F 21/84 |
| EP | 2359296 B1 * | 8/2021 | | G06F 3/067 |
| KR | 20050085000 A * | 8/2005 | | G06F 12/1458 |

OTHER PUBLICATIONS

ARM, "AMBA® AXI and ACE Protocol Specification", (2020), 500 pgs.

* cited by examiner

*Primary Examiner* — Sakinah White Taylor

(57) ABSTRACT

A system includes a hardware entity that can perform tasks in a secure mode or in an insecure mode. The system's secure resources include a secure memory and a secure logical interface (LIF). The system's insecure resources include an insecure memory and a first insecure LIF. A security mode circuit in the hardware entity can set the hardware entity to secure mode or to insecure mode. Tasks submitted via the secure LIF are performed in secure mode. Tasks submitted via the insecure LIF are performed in insecure mode. The tasks are associated with security mode status indicators that are written to the hardware entities security mode indicator to thereby set the hardware entity into secure mode or insecure mode. The hardware entity cannot access secure resources while in insecure mode.

14 Claims, 13 Drawing Sheets

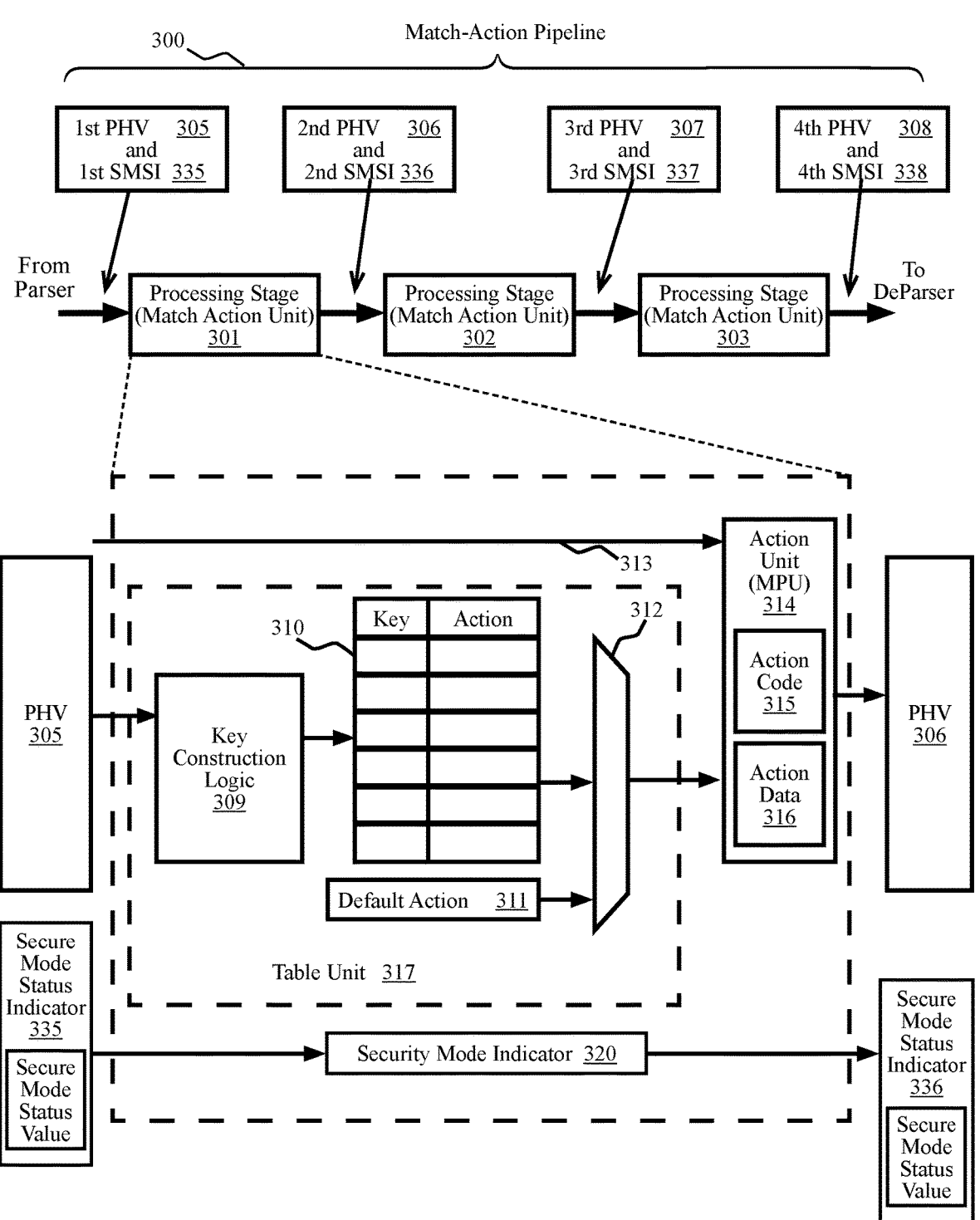

300

Match-Action Pipeline

1st PHV   305
and
1st SMSI 335

2nd PHV   306
and
2nd SMSI 336

3rd PHV   307
and
3rd SMSI 337

4th PHV   308
and
4th SMSI 338

From
Parser

Processing Stage
(Match Action Unit)
301

Processing Stage
(Match Action Unit)
302

Processing Stage
(Match Action Unit)
303

To
DeParser

313

Action
Unit
(MPU)
314

Action
Code
315

Action
Data
316

312

Key | Action

310

PHV
305

Key
Construction
Logic
309

Default Action    311

PHV
306

Secure
Mode
Status
Indicator
335

Secure
Mode
Status
Value

Table Unit   317

Security Mode Indicator  320

Secure
Mode
Status
Indicator
336

Secure
Mode
Status
Value

FIG. 3

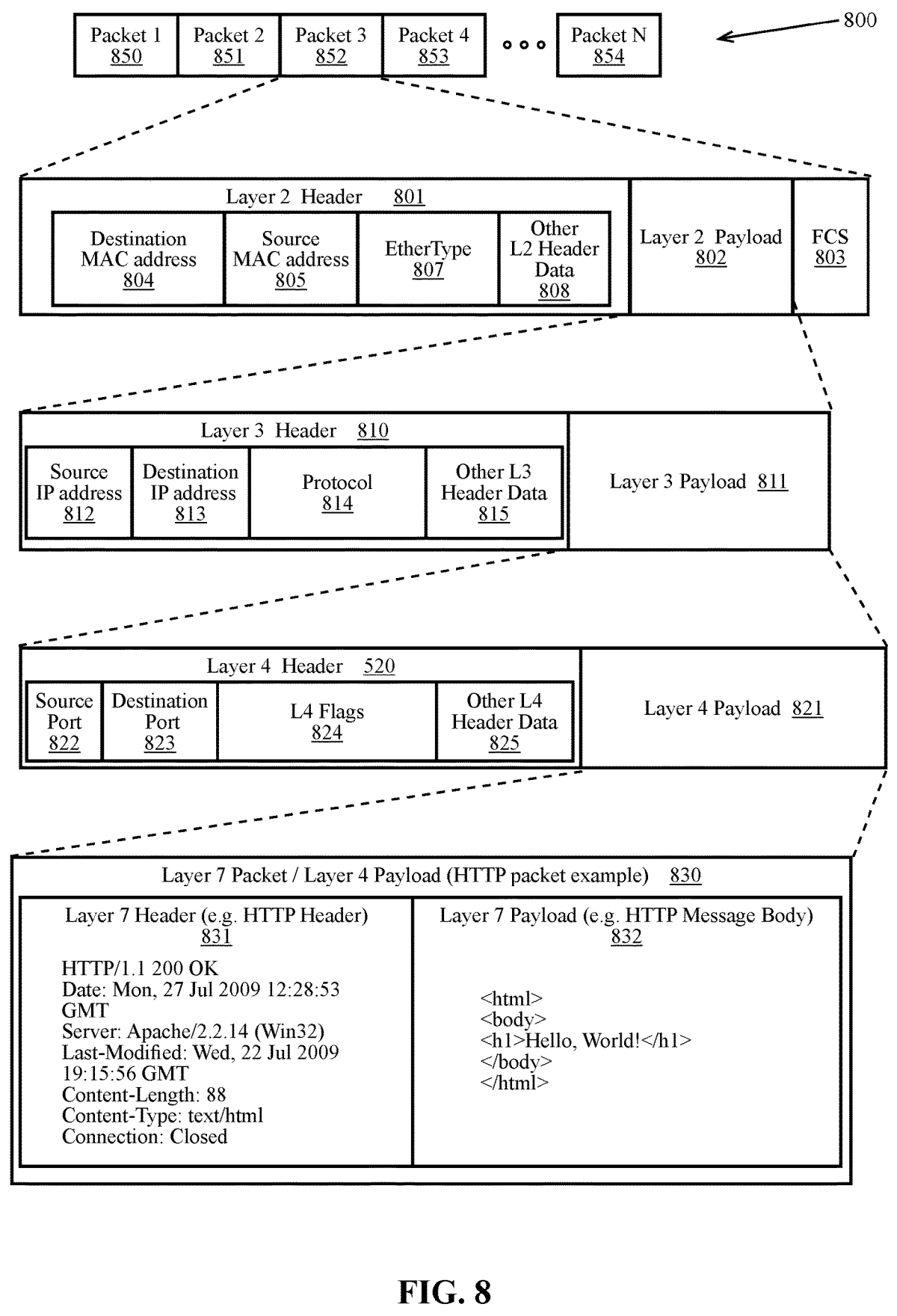

| Packet 1 850 | Packet 2 851 | Packet 3 852 | Packet 4 853 | o o o | Packet N 854 |
|---|---|---|---|---|---|

← 800

Layer 2 Header    801

| Destination MAC address 804 | Source MAC address 805 | EtherType 807 | Other L2 Header Data 808 | Layer 2 Payload 802 | FCS 803 |
|---|---|---|---|---|---|

Layer 3 Header    810

| Source IP address 812 | Destination IP address 813 | Protocol 814 | Other L3 Header Data 815 | Layer 3 Payload 811 |
|---|---|---|---|---|

Layer 4 Header    520

| Source Port 822 | Destination Port 823 | L4 Flags 824 | Other L4 Header Data 825 | Layer 4 Payload 821 |
|---|---|---|---|---|

Layer 7 Packet / Layer 4 Payload (HTTP packet example)    830

| Layer 7 Header (e.g. HTTP Header) 831 | Layer 7 Payload (e.g. HTTP Message Body) 832 |
|---|---|
| HTTP/1.1 200 OK<br>Date: Mon, 27 Jul 2009 12:28:53 GMT<br>Server: Apache/2.2.14 (Win32)<br>Last-Modified: Wed, 22 Jul 2009 19:15:56 GMT<br>Content-Length: 88<br>Content-Type: text/html<br>Connection: Closed | `<html>`<br>`<body>`<br>`<h1>Hello, World!</h1>`<br>`</body>`<br>`</html>` |

FIG. 8

| PHV (Task is Block Encryption Command)    1101 | |
|---|---|
| Data Block Source Address | Command Identifier |
| Processed Block Destination Address | Encryption Key Address |
| Encryption Algorithm Identifier | Doorbell Address |
| Data Block Size | Miscellaneous Flags, etc. |

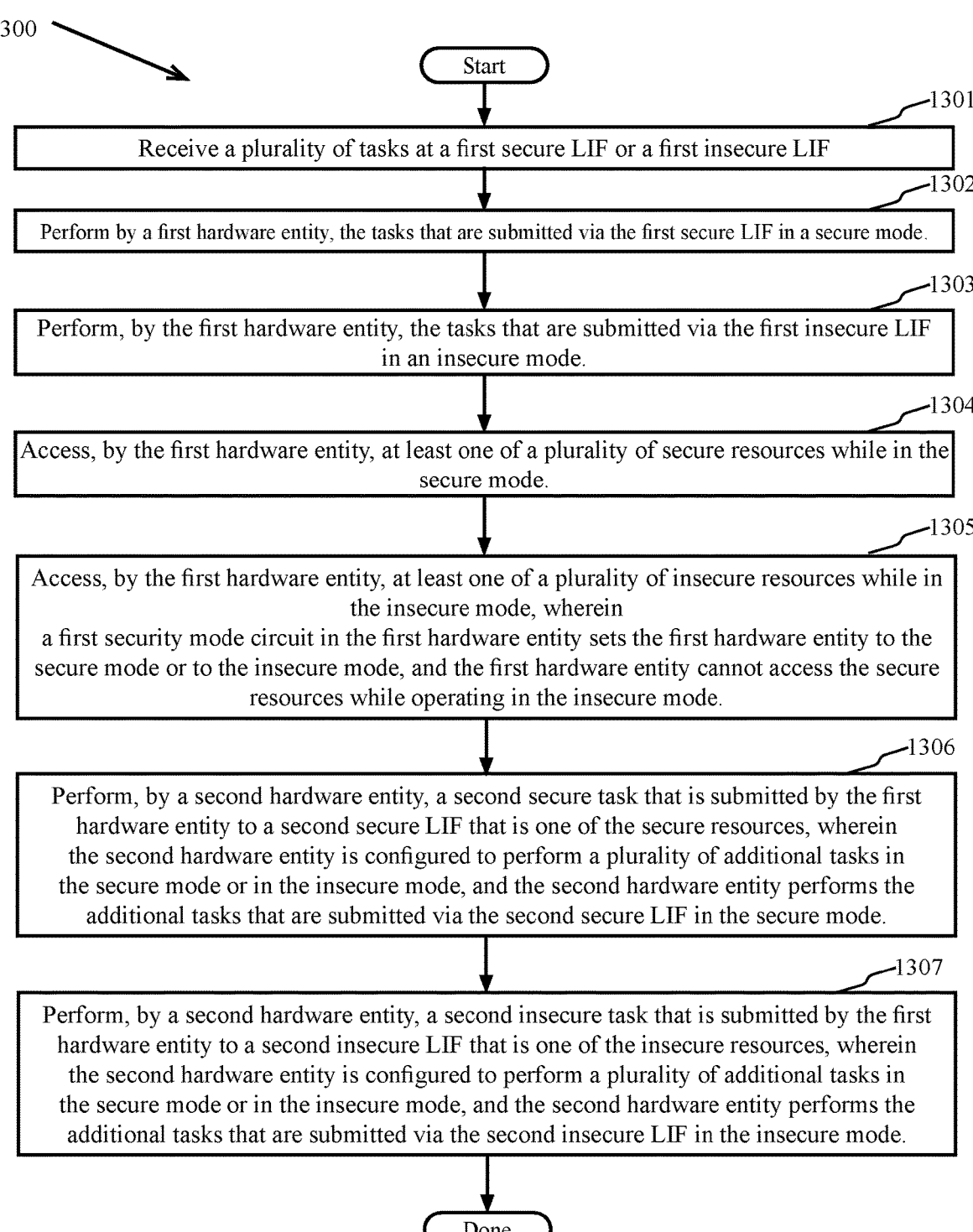

1300

Start

1301
Receive a plurality of tasks at a first secure LIF or a first insecure LIF

1302
Perform by a first hardware entity, the tasks that are submitted via the first secure LIF in a secure mode.

1303
Perform, by the first hardware entity, the tasks that are submitted via the first insecure LIF in an insecure mode.

1304
Access, by the first hardware entity, at least one of a plurality of secure resources while in the secure mode.

1305
Access, by the first hardware entity, at least one of a plurality of insecure resources while in the insecure mode, wherein
a first security mode circuit in the first hardware entity sets the first hardware entity to the secure mode or to the insecure mode, and the first hardware entity cannot access the secure resources while operating in the insecure mode.

1306
Perform, by a second hardware entity, a second secure task that is submitted by the first hardware entity to a second secure LIF that is one of the secure resources, wherein the second hardware entity is configured to perform a plurality of additional tasks in the secure mode or in the insecure mode, and the second hardware entity performs the additional tasks that are submitted via the second secure LIF in the secure mode.

1307
Perform, by a second hardware entity, a second insecure task that is submitted by the first hardware entity to a second insecure LIF that is one of the insecure resources, wherein the second hardware entity is configured to perform a plurality of additional tasks in the secure mode or in the insecure mode, and the second hardware entity performs the additional tasks that are submitted via the second insecure LIF in the insecure mode.

Done

FIG. 13

METHODS AND SYSTEMS FOR RUNNING SECURE PIPELINE TASKS AND INSECURE PIPELINE TASKS IN THE SAME HARDWARE ENTITIES

TECHNICAL FIELD

The descriptions and drawings relate to computer networks, local area networks, networking devices such as routers, switches, network interface cards (NICs), smart NICs, data processing units (DPUs), and distributed service cards (DSCs). The descriptions and drawings also relate to packet processing pipelines, semiconductor chips implementing packet processing pipelines, match-action pipelines, and to using running secure mode tasks and insecure mode tasks in the same match-action pipeline.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of networking devices is currently defined in the "P4$_{16}$ Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, processing stages, control flow, extern objects, user-defined metadata, and intrinsic metadata. A P4 pipeline can include processing stages that generate a key, and use the key to perform a table look up. The result of the table look up can identify an action that is to be performed.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented by a system. The system can include a plurality of secure resources that include a first secure logical interface (LIF), a plurality of insecure resources that include a first insecure LIF, a first hardware entity configured to perform a plurality of tasks in a secure mode or in an insecure mode, and a first security mode circuit in the first hardware entity that sets the first hardware entity to the secure mode or the insecure mode, wherein the tasks that are submitted via the first secure LIF are performed in the secure mode, and the tasks that are submitted via the first insecure LIF are performed in the insecure mode.

Another aspect of the subject matter described in this disclosure can be implemented in a method. The method can include receiving a plurality of tasks at a first secure LIF or a first insecure LIF, performing, by a first hardware entity, the tasks that are submitted via the first secure LIF in a secure mode, performing, by the first hardware entity, the tasks that are submitted via the first insecure LIF in an insecure mode, accessing, by the first hardware entity, at least one of a plurality of secure resources while in the secure mode, and accessing, by the first hardware entity, at least one of a plurality of insecure resources while in the insecure mode, wherein a first security mode circuit in the first hardware entity sets the first hardware entity to the secure mode or to the insecure mode, and the first hardware entity cannot access the secure resources while operating in the insecure mode.

Yet another aspect of the subject matter described in this disclosure can be implemented in a system. The system can include a first hardware means for performing a plurality of tasks in a secure mode or in an insecure mode, a second hardware means for performing a plurality of additional tasks in the secure mode or in the insecure mode, a secure task submission means for submitting one of the tasks to the first hardware means, a second secure task submission means for submitting one of the additional tasks to the second hardware means, and an insecure task submission means for submitting another one of the tasks to the first hardware means, wherein the tasks that are submitted via the secure task submission means are performed in the secure mode by the first hardware means, the tasks that are submitted via the insecure task submission means are performed in the insecure mode by the first hardware means, the additional tasks that are submitted via the second secure task submission means are performed in the secure mode by the second hardware means, the first hardware means submits the one of the additional tasks to the second hardware means via the second secure task submission means, and the first hardware means cannot access a plurality of secure resources that include the second secure task submission means while operating in the insecure mode.

In some implementations of the methods and devices, the first hardware entity accesses one of the secure resources while performing a first secure task submitted via the first secure LIF, and the first hardware entity accesses one of the insecure resources while operating in the secure mode. In some implementations of the methods and devices, a second hardware entity is configured to perform a plurality of additional tasks in the secure mode or in the insecure mode, a second security mode circuit in the second hardware entity sets the second hardware entity to the secure mode or the insecure mode, the secure resources include a second secure LIF, a first secure task that is submitted via the first secure LIF causes the first hardware entity to submit a second secure task to the second hardware entity via the second secure LIF, and the second hardware entity performs the second secure task in the secure mode. In some implementations of the methods and devices, the insecure resources include a second insecure LIF, a first insecure task that is submitted via the first insecure LIF causes the first hardware entity to submit a second insecure task to the second hardware entity via the second insecure LIF, and the second hardware entity performs the second insecure task in the insecure mode. In some implementations of the methods and devices, the first hardware entity implements a processing stage of a packet processing pipeline circuit, and the second hardware entity implements another processing stage of the packet processing pipeline circuit.

In some implementations of the methods and devices, a secure task can cause the first hardware entity to switch from the secure mode to the insecure mode, and an insecure task cannot cause the first hardware entity to switch from the secure mode to the insecure mode. In some implementations of the methods and devices, the first hardware entity performs a secure task by executing a plurality of secure task executable instructions that are stored in a secure memory that is one of the secure resources, and the first hardware entity performs an insecure task by executing a plurality of insecure task executable instructions that are stored in an insecure memory that is one of the insecure resources. In some implementations of the methods and devices, the secure resources include a secure memory that stores secure task data that is accessed by the first hardware entity while performing a secure task submitted via the first secure LIF, and the insecure resources include an insecure memory that stores insecure task data that is accessed by the first hardware entity while performing an insecure task submitted via the first insecure LIF. In some implementations of the methods and devices, the first hardware entity is a cryptography circuit. In some implementations of the methods and devices, a device can include a secure entity that submits a secure task to the first hardware entity via the first secure LIF. In some implementations of the methods and devices, submitting a secure task to the first hardware entity includes writing into a secure doorbell that is one of the secure resources, and submitting an insecure task to the first hardware entity includes writing into an insecure doorbell that is one of the insecure resources.

In some implementations of the methods and devices, a device can include an advanced extensible interface (AXI) bus that supports secure access protections, wherein the secure access protections prevent a task that is running in the insecure mode from accessing a secure memory that is one of the secure resources, and the secure access protections allow a second task that is running in the secure mode to access the secure memory. In some implementations of the methods and devices, the secure LIF is mapped into the secure memory that is one of the secure resources, the secure access protections prevent an entity in the insecure mode from accessing the secure LIF, and the secure access protections allow an entity in the secure mode to access the secure memory. In some implementations of the methods and devices, the secure resources include a first security mode status indicator that is in the first hardware entity, setting the first security mode status indicator to a first value sets the first hardware entity to the secure mode, and setting the first security mode status indicator to a second value sets the first hardware entity to the insecure mode. In some implementations of the methods and devices, the method can include performing, by a second hardware entity, a second secure task that is submitted by the first hardware entity to a second secure LIF that is one of the secure resources, wherein the second hardware entity is configured to perform a plurality of additional tasks in the secure mode or in the insecure mode, and the second hardware entity performs the additional tasks that are submitted via the second secure LIF in the secure mode.

In some implementations of the methods and devices, performing, by a second hardware entity, a second insecure task that is submitted by the first hardware entity to a second insecure LIF that is one of the insecure resources, wherein the second hardware entity is configured to perform a plurality of additional tasks in the secure mode or in the insecure mode, and the second hardware entity performs the additional tasks that are submitted via the second insecure LIF in the insecure mode. In some implementations of the methods and devices, the first hardware entity implements a processing stage of a packet processing pipeline circuit, and the second hardware entity implements another processing stage of the packet processing pipeline circuit. In some implementations of the methods and devices, the secure resources include a first security mode status indicator that is in the first hardware entity, setting the first security mode status indicator to a first value sets the first hardware entity to the secure mode, and setting the first security mode status indicator to a second value sets the first hardware entity to the insecure mode.

These and other aspects will become more fully understood upon a review of the detailed description, which follows. Other aspects, features, and characteristics will become apparent to those of ordinary skill in the art, upon reviewing the following description of specific, examples in conjunction with the accompanying figures. While features may be discussed relative to certain examples and figures below, all examples may include one or more of the advantageous features discussed herein. In other words, while one or more examples may be described as having certain advantageous features, one or more of such features may be included any of the examples discussed herein. In similar fashion, while the examples may be discussed below as a device, a system, or a method, the examples may be implemented in various devices, systems, and methods.

BRIEF DESCRIPTION OF THE DRAWINGS

FIG. 3 is a functional block diagram illustrating an example of a processing stage in a match-action pipeline according to some aspects.

FIG. 8 illustrates packet headers and payloads of packets for network traffic flows including layer 7 fields according to some aspects.

FIG. 13 is a high level flow diagram illustrating a method for running secure and insecure tasks on the same hardware entities according to some aspects.

Throughout the description, similar reference numbers may be used to identify similar elements.

DETAILED DESCRIPTION

Figure 1A:
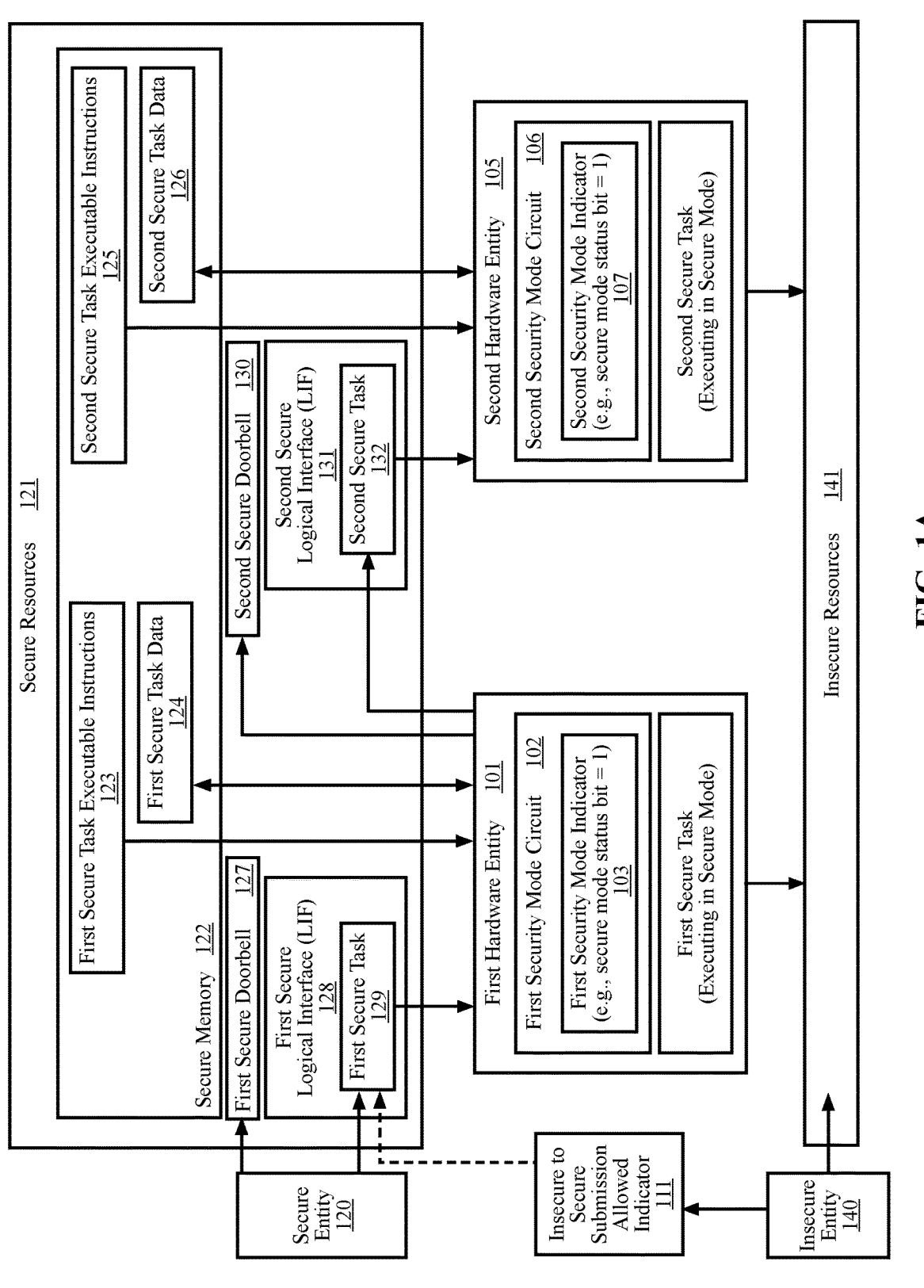
FIG. 1A is a high-level conceptual diagram illustrating a chain of secure operations being performed by hardware entities that can perform secure tasks and insecure tasks according to some aspects.

It will be readily understood that the examples and aspects of the examples generally described herein and illustrated in the appended figures could be arranged and designed in a wide variety of different configurations. Thus, the following more detailed description and the figures are not intended to limit the scope of the present disclosure, but merely present illustrative examples. The drawings are not necessarily drawn to scale unless specifically indicated. The described examples are to be considered in all respects only as illustrative and not restrictive. The scope of the claims is therefore indicated by the claims themselves rather than this detailed description or the drawings. All changes which come within the meaning and range of equivalency of the claims are to be embraced within their scope.

Reference throughout this specification to features, advantages, or similar language does not imply that all the features and advantages that may be realized should be or must be in any single example. Rather, language referring to the features and advantages is understood to mean that a specific feature, advantage, or characteristic described in an example is included in that example and possibly in other examples. Thus, discussions of the features and advantages, and similar language, throughout this specification may, but do not necessarily, refer to the same example.

Furthermore, the described features, advantages, characteristics, and aspects may be combined in any suitable manner in one or more example. One skilled in the relevant art will recognize, in light of the description herein, that one or more of the features, advantages, characteristics, or aspects may be omitted from some examples. Other examples may include additional features and advantages.

Networking devices such as switches, routers, NICs, and DPUs may need to perform operations that are secure and operations that are insecure. For example, encrypting outgoing data can be a secure operation because it requires use of an encryption key that must be kept secure. Once the data is encrypted, the subsequent operations for sending the data out on the network may be insecure operations. Another example is that all traffic that is received via an ingress port is assumed to be insecure and the processing of that insecure traffic should preclude the possibility of compromising secure data and secure operations. Workloads in secure environments may require secure operations that are performed by hardware and software that has been certified as secure. Workloads in insecure environments may take advantage of rapid upgrade cycles for improved capabilities and performance. One solution is to use duplicate hardware to thereby split the secure and the insecure operations between the different hardware. Such a solution is costly. Another solution is to use secure logical interfaces (LIFs) and insecure LIFs with hardware that maintains secure mode status indicators for the task that is being performed.

When a task is submitted to a logical interface (LIF) the LIF can use a secure mode status indicator to tag the task as secure or insecure. Tasks submitted to a secure LIF are marked as secure. Tasks submitted to an insecure LIF are marked as insecure. The hardware that processes the tasks performs insecure tasks within an insecure environment and performs secure tasks within a secure environment. The hardware is unable to change a secure mode status indicator from insecure to secure. The hardware may be able to change a secure mode status indicator from secure to insecure. As such, the hardware may be certified as secure and the software running in the secure environment may be certified as secure. A secure environment is provided when the hardware and the software executed by the hardware are both certified as secure.

One of the advantages of using secure mode status indicators as taught herein is that there is no need to duplicate hardware. Secure and insecure environments can be provided by the same hardware. Another advantage is that a task may include a transition from secure to insecure. For example, a task may include encrypting data in the secure environment, transitioning to the insecure environment, and then encapsulating the data in a packet and transmitting the packet. As such, the portion of the task requiring security gets security while the rest of the task may be performed using insecure software that has been recently upgraded to provide additional capabilities. Duplicate hardware may be unable to perform such a mix of secure and insecure processing.

In the field of data networking, the functionality of networking devices such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in a fixed function application specific integrated circuit (ASIC). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1A is a high-level conceptual diagram illustrating a chain of secure operations being performed by hardware entities that can perform secure tasks and insecure tasks according to some aspects. Secure resources 121 can include a secure memory 122, a first secure doorbell 127, a first secure LIF 128, a second secure doorbell 130, and a second secure LIF 131. The secure memory 122 can store first secure task executable instructions 123, first secure task data 124, second secure task executable instructions 125, and second secure task data 126. A secure entity 120, such as a secure server process running on a host computer, can submit a first secure task 129 to the first secure LIF 128. The first secure LIF 128 tags the first secure task 129 with a secure mode status indicator that is set to the secure value (e.g., 1) to thereby indicate that the task is to be run in secure mode. The secure entity can then ring the secure doorbell 127 to alert a scheduler of the task's arrival. A doorbell can be a memory location, a bit in a register, etc. A doorbell can be rung by setting it to a value such as one. The scheduler queues the first secure task 129 for processing by a first hardware entity 101. A scheduler that is unable to change the secure mode status indicators of tasks may be certified as a secure scheduler. Here, the LIF provides the secure mode status indicator and sets the secure mode status value in the secure mode status indicator. In other implementations, such as when the LIF is an area of memory that an entity writes to, the scheduler provides the secure mode status indicator and sets the secure mode status value in the secure mode status indicator. When scheduling a task from a secure LIF, the scheduler sets the secure mode status value in the secure mode status indicator to indicate secure mode operations. When scheduling a task from an insecure LIF, the scheduler sets the secure mode status value in the secure mode status indicator to indicate insecure mode operations.

The first hardware entity 101 has a first security mode circuit 102 (e.g., a register) that includes a first security mode indicator 103 (e.g., a status bit in a register). A secure mode status value that is stored in the secure mode status indicator of the first secure task 129 is copied into the first security mode indicator 103. The first security mode circuit 102 sets the first hardware entity 101 into secure mode or insecure mode in accordance with the value in the first security mode indicator 103. The first security mode indicator 103 indicates that the task is a secure mode task. As such, the first security mode circuit 102 sets the first hardware entity 101 into secure mode. The first hardware entity 101 then executes the first secure task in secure mode. While in secure mode, the first hardware entity 101 may access insecure resources 141 in many implementations. For example, secure mode operations may include reading and using a public key that is stored in insecure memory. In other implementations, hardware entities running in secure mode may be unable to access insecure resources while running in secure mode such that secure mode operations are thereby protected from insecure code, malware and other threats that may lurk within the insecure resources 141. A configuration indicator (e.g., a register bit) may control a hardware entity's ability to access an insecure resource while in secure mode.

The first hardware entity 101 may execute first secure task executable instructions 123 and access first secure task data 124 while performing the first secure task 129. The first secure task 129 may be part of a secure pipeline task. An example of a secure pipeline task is a task that is performed as a series of secure sub tasks (e.g., first secure task 129 and second secure task 132) in a series of hardware entities (e.g., first hardware entity 101 and second hardware entity 105). The first hardware entity 101 is a secure entity when running in secure mode. As such, performing the first secure task 129 within the first hardware entity 101 can include submitting the second secure task 132 to the second secure LIF 131 and ringing the second secure doorbell 130. The second secure LIF 131 tags the second secure task 132 with a secure mode status indicator set to the secure value (e.g., 1) to thereby indicate that the task is to be run in secure mode. The scheduler queues the second secure task 132 for processing by the second hardware entity 105.

The second hardware entity 105 has a second security mode circuit 106 that includes a second security mode indicator 107 (e.g., a status bit in a register). A secure mode status value that is stored in the secure mode status indicator of the second secure task 132 is copied into the second security mode indicator 107. The second security mode circuit 106 sets the second hardware entity 105 into secure mode or insecure mode in accordance with the value in the second security mode indicator 107. The second security mode indicator 107 indicates that the task is a secure mode task. As such, the second security mode circuit 106 sets the second hardware entity 105 into secure mode. The second hardware entity 105 then executes the second secure task in secure mode. The second hardware entity 105 may execute second secure task executable instructions 125 and access second secure task data 126 while performing the second secure task 132.

An insecure to secure submission allowed indicator 111 may be used to control the submission of tasks from an insecure entity to a secure LIF. As illustrated in FIG. 1A, the insecure to secure submission allowed indicator 111 may globally to all of the secure LIFs. A secure LIF may include a local insecure to secure submission allowed indicator that overrides the global insecure to secure submission allowed indicator 111. Similarly, a global secure to insecure resource access allowed indicator may control whether hardware entities running in secure mode can access insecure resources 141. A hardware entity may include a local secure to insecure resource access allowed indicator that overrides the global secure to insecure resource access allowed indicator.

Figure 1B:
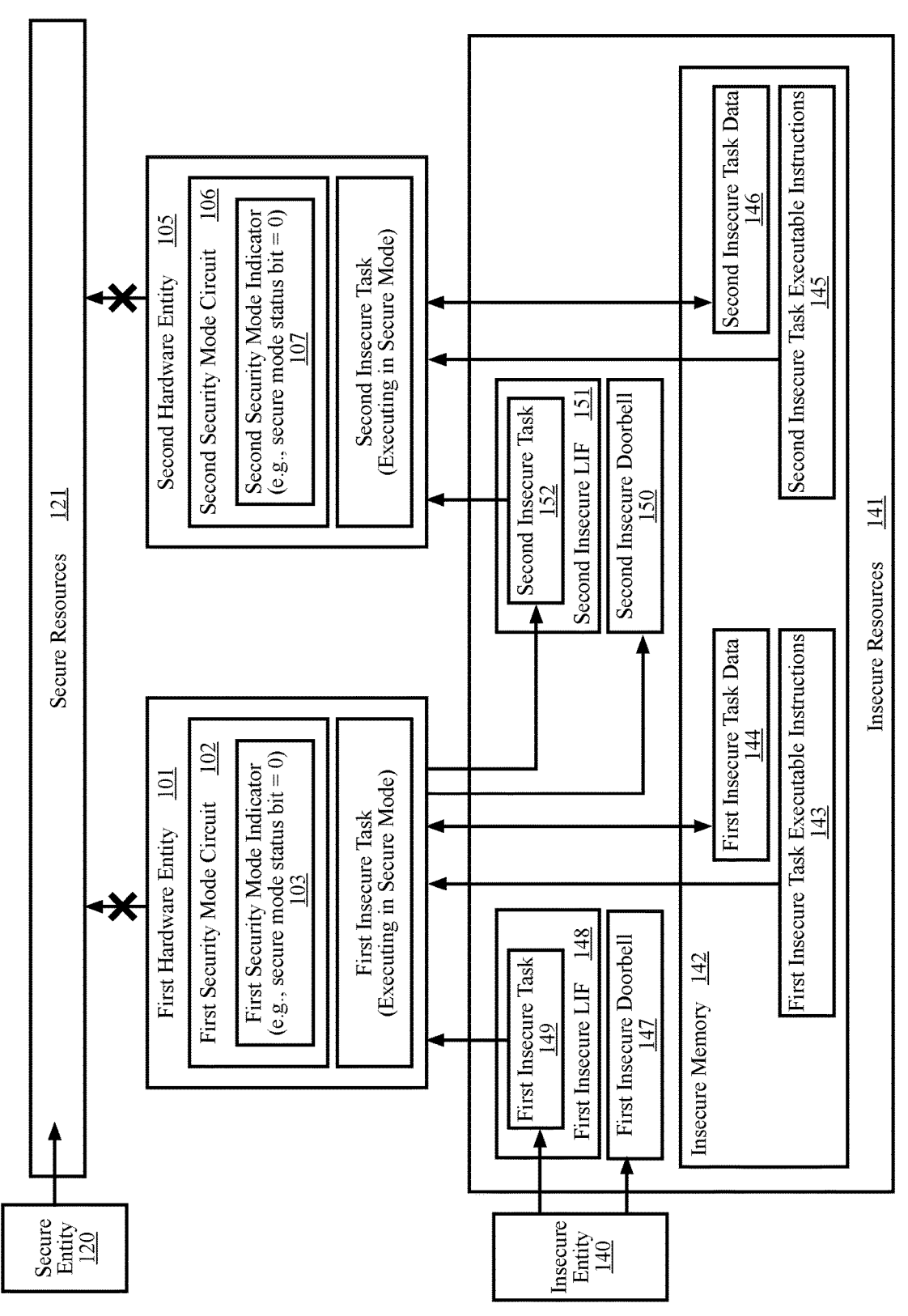
FIG. 1B is a high-level conceptual diagram illustrating a chain of insecure operations being performed by hardware entities that perform secure tasks and insecure tasks according to some aspects.

FIG. 1B is a high-level conceptual diagram illustrating a chain of insecure operations being performed by hardware entities that perform secure tasks and insecure tasks according to some aspects. The hardware entities illustrated in FIG. 2 can be the same as the hardware entities shown in FIG. 1. Insecure resources 141 can include an insecure memory 142, a first insecure doorbell 147, a first insecure LIF 148, a second insecure doorbell 150, and a second insecure LIF 151. The insecure memory 142 can store first insecure task executable instructions 143, first insecure task data 144, second insecure task executable instructions 145, and second insecure task data 146. An insecure entity 140, such as an insecure server process running on a host computer, can submit a first insecure task 149 to the first insecure LIF 148. The first insecure LIF 148 tags the first insecure task 149 with a secure mode status indicator set to the insecure value (e.g., 0) to thereby indicate that the task is to be run in insecure mode. The insecure entity can then ring the first insecure doorbell 147 to alert the scheduler of the task's arrival. The scheduler queues the first insecure task 149 for processing by a first hardware entity 101.

The secure mode status value that is stored in the secure mode status indicator of the first insecure task 149 is copied into the first security mode indicator 103 thereby setting the first hardware entity 101 into insecure mode. The first hardware entity 101 then executes the first insecure task in insecure mode. While in insecure mode, the first hardware entity 101 is unable to access secure resources 121. The secure resources 121 are thereby protected from insecure code, malware and other threats that may lurk within the insecure resources 141. The first hardware entity 101 may execute first insecure task executable instructions 143 and access first insecure task data 144 while performing the first insecure task 149. The first insecure task 149 may be part of an insecure pipeline task. An example of an insecure pipeline task is a task that is performed as a series of insecure sub tasks (e.g., first insecure task 149 and second insecure task 152) in a series of hardware entities (e.g., first hardware entity 101 and second hardware entity 105). The first hardware entity 101 is an insecure entity when running in insecure mode. As such, performing the first insecure task 149 within the first hardware entity 101 can include submitting the second insecure task 152 to the second insecure LIF 151 and ringing the second insecure doorbell 150. The second insecure LIF 151 tags the second insecure task 152 with a secure mode status indicator set to the insecure value (e.g., 0) to thereby indicate that the task is to be run in insecure mode. The scheduler queues the second insecure task 152 for processing by the second hardware entity 105.

The secure mode status value that is stored in the secure mode status indicator of the second insecure task 152 is copied into the second security mode indicator 107 thereby setting the second hardware entity 105 into insecure mode. The second hardware entity 105 then executes the second insecure task in insecure mode. While in insecure mode, the second hardware entity 105 is unable to access secure resources 121. The secure resources 121 are thereby protected from insecure code, malware and other threats that may lurk within the insecure resources 141. The second hardware entity 105 may execute second insecure task executable instructions 145 and access second insecure task data 146 while performing the second insecure task 152.

Insecure entities may be unable to submit tasks to a secure LIF either as a hardware design choice or under the control of a configuration indicator such as the insecure to secure submission allowed indicator 111. As such insecure entity 140 cannot submit a secure task via the first secure LIF 128 or any other secure LIF. Furthermore, a hardware entity running in insecure mode is an insecure entity and may therefore be unable to submit tasks to a secure LIF. In some devices complete separation of the secure and insecure environments is required and, as such, secure entities are unable to submit tasks to an insecure LIF. In such devices a hardware entity running in secure mode, which is a secure mode entity, and the secure entity 120 cannot submit an insecure task via the first insecure LIF 148 or any other insecure LIF. Furthermore, the hardware entity is unable to transition into an insecure entity by setting its security mode indicator to indicate insecure mode operation. In other devices a secure pipeline task is allowed to transition to an insecure pipeline task in order to, for example, encrypt data securely and then packetize the encrypted data insecurely. A secure pipeline task can transition to an insecure pipeline task when a hardware entity running in secure mode submits an insecure task to an insecure LIF. In such implementations, a task can cause a hardware entity to transition from secure mode to insecure mode by setting the hardware entity's security mode indicator to a value indicating insecure mode. After the hardware entity transitions from secure mode to insecure mode, it can access insecure resources. A hardware entity running in secure mode may access insecure resources by first transitioning to insecure mode.

Figure 2:
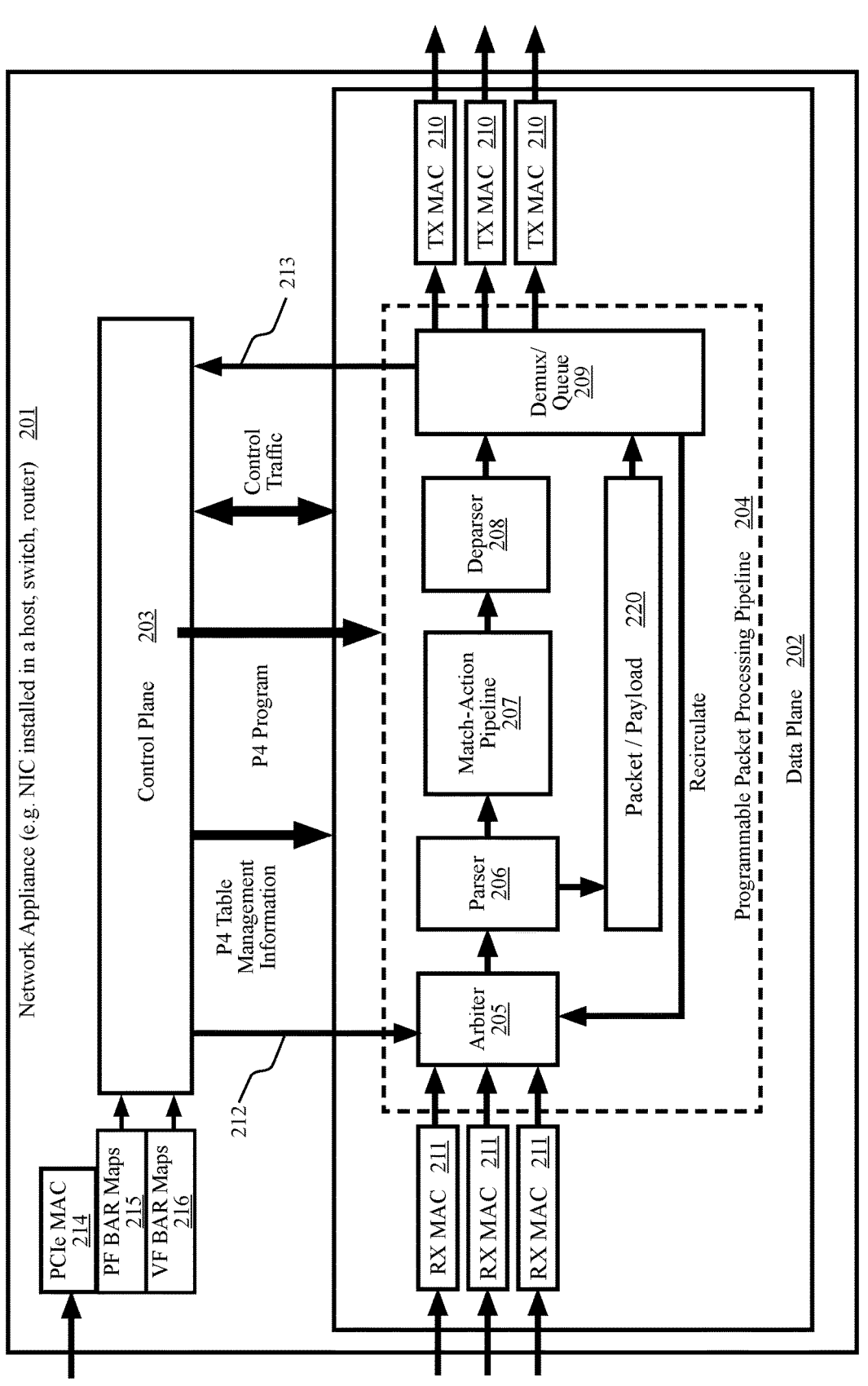
FIG. 2 is a functional block diagram of a network device having a control plane and a data plane and in which aspects may be implemented.

The LIFs in FIG. 1 and FIG. 2 are illustrated as resources that are not in the secure memory 122 or the insecure memory 142. The LIFs may be implemented as memory locations such that a task is submitted to a LIF by writing the task, as a data object such as a PHV, to the memory location of the LIF. Ringing the doorbell can alert a scheduler that a task is stored at the memory location. In this manner, the LIFs can be created or deleted programmatically while configuring a device such as a networking device. The secure LIFs can be mapped into an area the secure memory 122. The insecure LIFs can be mapped into an area of the insecure memory 142.

FIG. 2 is a functional block diagram of a networking device 201 having a control plane and a data plane and in which aspects may be implemented. A networking device 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QOS), filtering, encapsulation, queuing, and policing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," has developed as a way to provide some flexibility at the data plane of a networking device. The document "P416 Language Specification," version 1.2.2, published by the P4 Language Consortium on May 17, 2021, which is incorporated by reference herein, describes the P4 domain-specific language that can be used for programming the data plane of networking devices. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, processing stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output CPU port 213. The control plane is often referred to as a CPU (central processing unit) although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The Infini-Band PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

FIG. 3 is a functional block diagram illustrating an example of a processing stage 301 in a match-action pipeline 300 according to some aspects. FIG. 3 introduces certain concepts related to processing stages and match-action pipelines and is not intended to be limiting. The processing stages are also referred to as match-action units. The processing stages 301, 302, 303 of the match-action pipeline 300 are programmed to perform "match-action" operations in which a table unit performs the match and the MPUs perform the actions. The table unit can perform the match by using at least a portion of the PHV to look up an action indicator. The MPUs, also called action units, can perform the action based on the action indicator that is output from the table unit. A processing stage may include more than one MPU. A PHV generated at the parser may be passed through each of the processing stages in the match-action pipeline in series and each processing stage can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first processing stage 301 receives PHV 1 305 as an input and outputs PHV 2 306. The second processing stage 302 receives PHV 2 306 as an input and outputs PHV 3 307. The third processing stage 303 receives PHV 3 307 as an input and outputs PHV 4 308.

Secure mode status indicators can be communicated along with the PHVs. For example, each PHV may include a secure mode status indicator or the secure mode status indicator may be communicated in parallel with the PHV. FIG. 3 illustrates PHVs and secure mode status indicators being communicated in parallel with the PHVs. A first secure mode status indicator 335 is communicated in parallel with the first PHV 305. A second secure mode status indicator 336 is communicated in parallel with the second PHV 306. A third secure mode status indicator 337 is communicated in parallel with the third PHV 307. A fourth secure mode status indicator 338 is communicated in parallel with the fourth PHV 308. A processing stage 301 can have a security mode indicator 320 that stores a security mode status value. For example, the security mode indicator 320 can be a register bit and the security mode status value in the first secure mode status indicator 335 can be copied into the security mode indicator 320 to set the processing stage into secure mode or insecure mode. For example, a 0 in the security mode indicator can set the processing stage to insecure mode while a 1 in the security mode indicator can set the processing stage to secure mode. The value in the security mode indicator 320 can be copied into the output secure mode status indicator 336 and then used to set the security mode of the next processing stage. Here, each of the processing stages 301, 302, 303 are hardware entities. As with other hardware entities one of the processing stages may transition from secure mode to insecure mode by changing the security mode indicator 320. As such, the subsequent processing stage will be in insecure mode as they process the pipeline task associated with the PHVs 305, 306, 307, 308.

An expanded view of elements of a processing stage 301 of match-action pipeline 300 is shown. The processing stage includes a table unit 317 that operates on an input PHV 305 and an action unit 314 (also called an MPU) that produces an output PHV 306, which may be a modified version of the input PHV 305. The table unit 317 can include key construction logic 309, a lookup table 310, and selector logic 312. The key construction logic 309 can be configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and a corresponding action indicator such as an action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the processing stage can be programmable by the control plane via P4 and the contents of the lookup table can be managed by the control plane.

Figure 4:
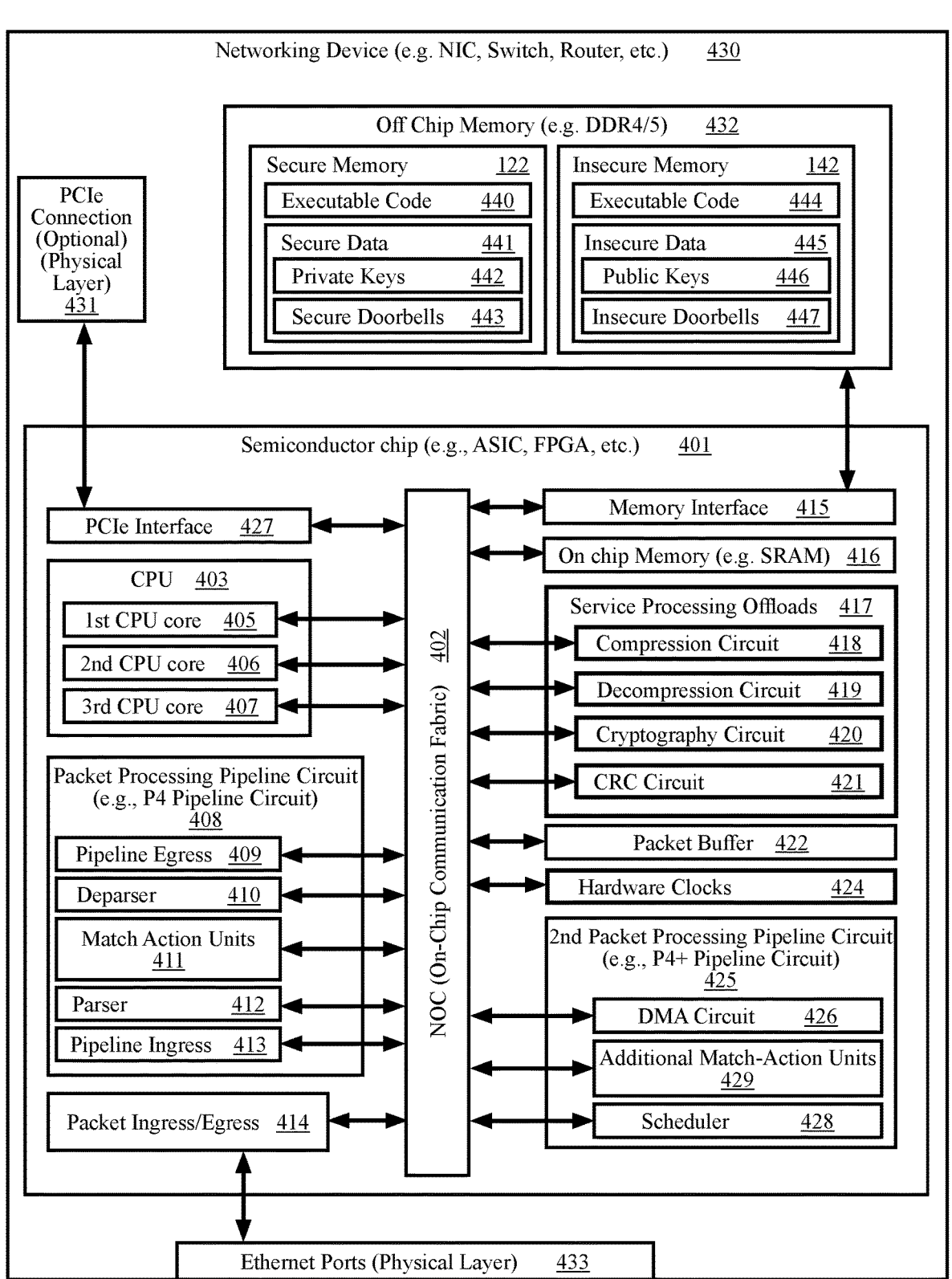
FIG. 4 is a functional block diagram illustrating an example of a networking device that includes hardware entities such as packet processing pipeline circuits, match-action units, cryptographic circuits, compression circuits, and other circuits according to some aspects.

FIG. 4 is a functional block diagram illustrating an example of a networking device 430 that includes hardware entities such as packet processing pipeline circuits 408, 425, match-action units 411, 429, cryptographic circuits 420, compression circuits 418, and other circuits according to some aspects. If the networking device is a network interface card (NIC) then the NIC can be installed in a host computer and can act as a networking device for the host computer and for virtual machines running on the host computer. Such a NIC can have a PCIe connection 431 for communicating with the host computer. The networking device 430 can have a semiconductor chip 401 (e.g., ASIC, FPGA, etc.), off chip memory 432, and ethernet ports 433. The off chip memory 432 can be one of the widely available memory modules or chips such as double data rate 5 (DDR5) synchronous dynamic random-access memory (SDRAM) such that the chip has access to many gigabytes of memory on the networking device 430. The ethernet ports 433 provide physical connectivity to a computer network such as the internet. The packet processing pipeline circuits 408, 425, match-action units 411, 429, cryptographic circuits 420, compression circuits 418, and other circuits may be hardware entities that include security mode indicators and that can operate in secure mode or insecure mode in accordance with the security mode indicators.

The semiconductor chip 401 can have many core circuits interconnected by an on-chip communications fabric, sometimes called a network on a chip (NOC) 402. NOCs are often implementations of standardized communications fabrics such as the widely used advanced extensible interface (AXI) bus. The semiconductor chip's core circuits can include a PCIe interface 427, a CPU 403, a packet processing pipeline circuit 408, memory interface 415, on chip memory 416 such as static random-access memory (SRAM), service processing offloads 417, a packet buffer 422, hardware clocks 424, a second packet processing pipeline 425, and packet ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The packet processing pipeline circuit 408 can include a pipeline ingress circuit 413, a parser circuit 412, match-action units 411, a deparser circuit 410, and a pipeline egress circuit 409. The service processing offloads 417 are circuits implementing functions that the semiconductor chip uses so often that the designer has chosen to provide hardware for offloading those functions from the CPUs. The service processing offloads can include a compression circuit 418, decompression circuit 419, a cryptography circuit 420, and a cyclic redundancy check (CRC) calculation circuit 421. The specific core circuits implemented within the non-limiting example of the semiconductor chip 401 can be selected such that the semiconductor chip implements many, perhaps all, of the functionality of an InfiniBand channel adapter, of an NVMe card, and of a networking device that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/ dequeuing a packet.

The packet processing pipeline circuits 408, 425 are a specialized set of elements for processing network packets such as IP (internet protocol) packets and InfiniBand PDUs (protocol data units). The packet processing pipeline circuits 408, 425 can be P4 pipeline circuits that can be configured using a domain-specific language such as the P4 domain specific language. As described in the P4 specification, the primary abstractions provided by the P4 language relate to header types, parsers, tables, actions, match-action units, processing stages, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store secure data in a secure memory 122 and insecure data in an insecure memory 142. The secure memory 122 can store executable code 440 and secure data 441 such as private keys 442 and secure doorbells 443. The insecure memory 142 can store executable code 444 and insecure data 445 such as public keys 446 and insecure doorbells 447.

The CPU cores 405, 406, 407 can be general purpose processor cores, such as ARM processor cores, or x86 processor cores. Each CPU core can include a memory interface, an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C. The CPU cores 405, 406, 407 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores available for control plane functions and for implementing aspects of a slow data path that includes software implemented packet processing functions. The CPU cores may be used to implement discrete packet processing operations such as layer 7 applications (e.g., HTTP load balancing, layer 7 firewalling, and/or layer 7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuit 408.

All memory transactions in the networking device 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 425, CPU 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
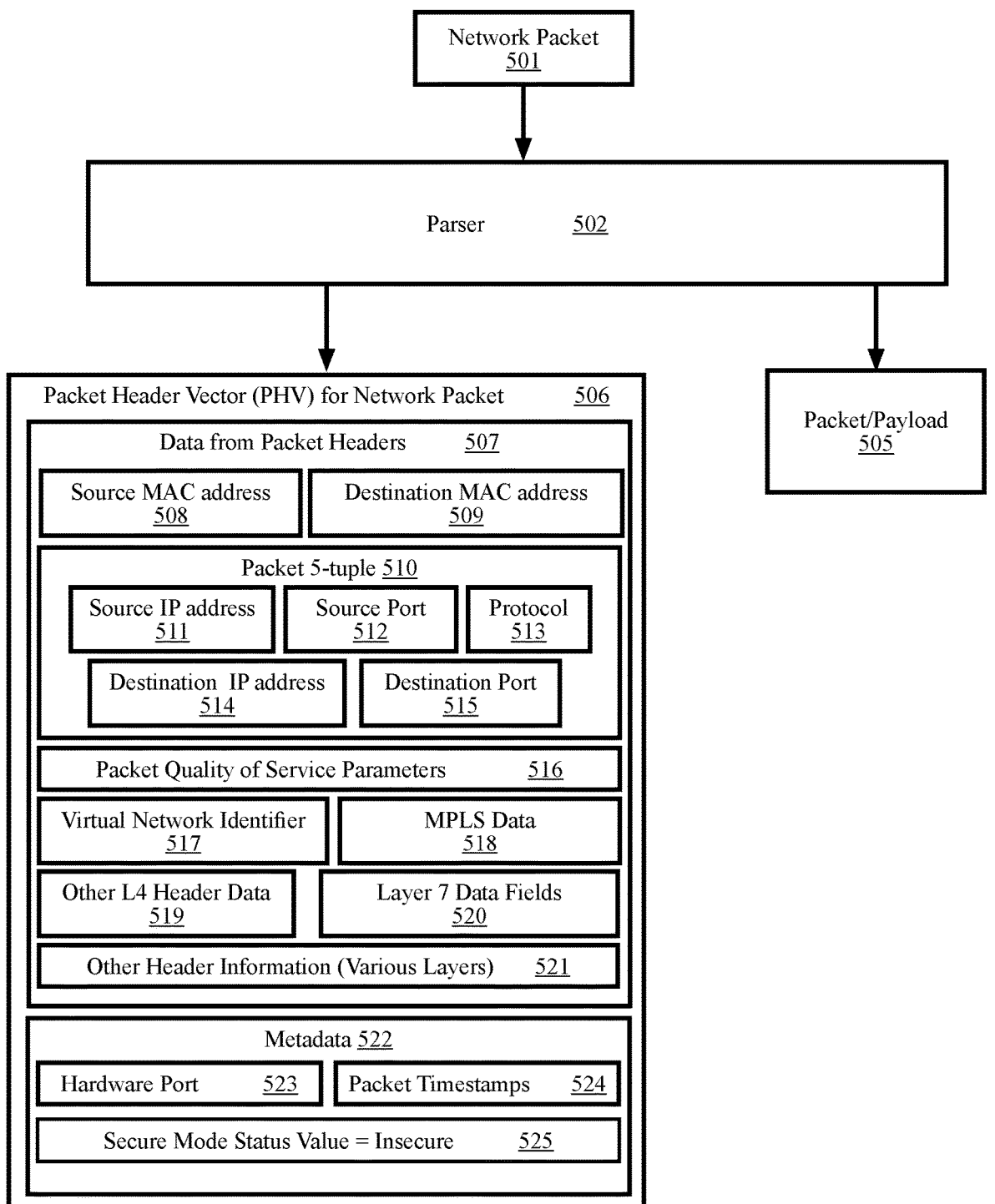
FIG. 5 is a high-level diagram illustrating an example of generating a packet header vector (PHV) from a packet according to some aspects.

FIG. 5 is a high-level diagram illustrating an example of generating a packet header vector 506 from a network packet 501 according to some aspects. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the networking device such as the secure mode status value 525, hardware port 523 on which the packet 501 was received and the packet timestamps 524 indicating when the packet 501 was received by the networking device, enqueued, dequeued, etc. The secure mode status value 525 can be set to indicate insecure because the ethernet ports 433 are insecure hardware entities. Packets received from outside the networking device can be deemed insecure by default when no such packets should be deemed trusted or secure.

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The virtual network identifier 517 may be obtained from the packet's layer 2 header. The multi-protocol label switching (MPLS) data 518, such as an MPLS label, may be obtained from the packet's layer 2 header. The other layer 4 data 519 can be obtained from the packet's layer 4 header. The layer 7 data fields 520 can be obtained from the packet's layer 7 header or layer 7 payload. The layer 7 data fields 520 can be obtained from the packet's layer 7 header or layer 7 payload. The other header information 521 is the other information contained in the packet's layer 2, layer 3, layer 4, and layer 7 headers.

The packet 5-tuple 510 is often used for generating keys. The packet 5-tuple 510 can include the source IP address 511, the source port 512, the protocol 513, the destination IP address 514, and the destination port 515. Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
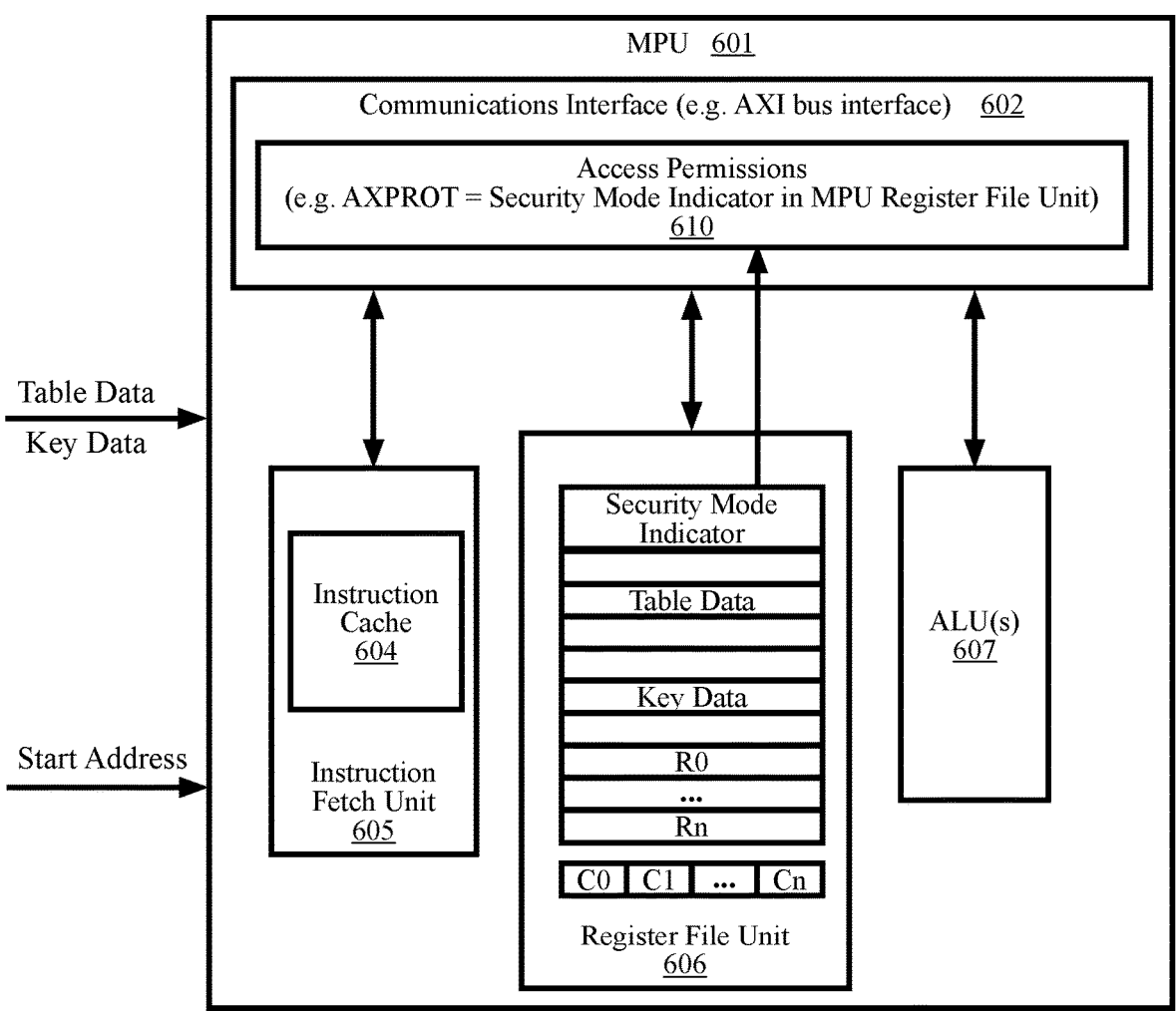
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units. The register file unit 606 can include a security mode indicator.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data may be transferred according the AXI protocol in the packet data communication on-chip interconnect system according to the example in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

An aspect of the communications interface 602 is that it can implement access permissions 610. For example, a standards compliant AXI bus interface implements access permissions using ARPROT and AWPROT (jointly referred to as AXPROT) bits. AXPROT=1 indicates a secure mode read or write while AXPROT=0 indicates an insecure mode read or write. As such, the security mode indicator in the register file unit 606 can be used to set the access permission 610 of the communications interface 602.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table unit. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table unit. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs. The one or more programs can be any programs such as P4 programs related to reading table data, building headers, DMA to/from memory, writing to/from memory, and various other actions. The one or more programs can be executed in any processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a processing stage may also provide data/program context to the register file of the subsequent stage, as well as making data/program context available to the next stage's execution data path (i.e., the source registers of the next stage's adder, shifter, and the like). A register of the register file may be 64 bits and may be initially loaded with special metadata values such as hash value from table lookup, packet size, PHV timestamp, programmable table constant and the like.

The register file unit 606 may include a comparator flags unit (e.g., C0, C1, . . . . Cn) configured to store comparator flags. The comparator flags can be set by calculation results generated by the ALU which in return can be compared with constant values in an encoded instruction to determine a conditional branch instruction. The MPU may have single bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general-purpose registers from the host memory.

A program may include executable instructions that are executed by a single MPU or by multiple MPUs in parallel or in series. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
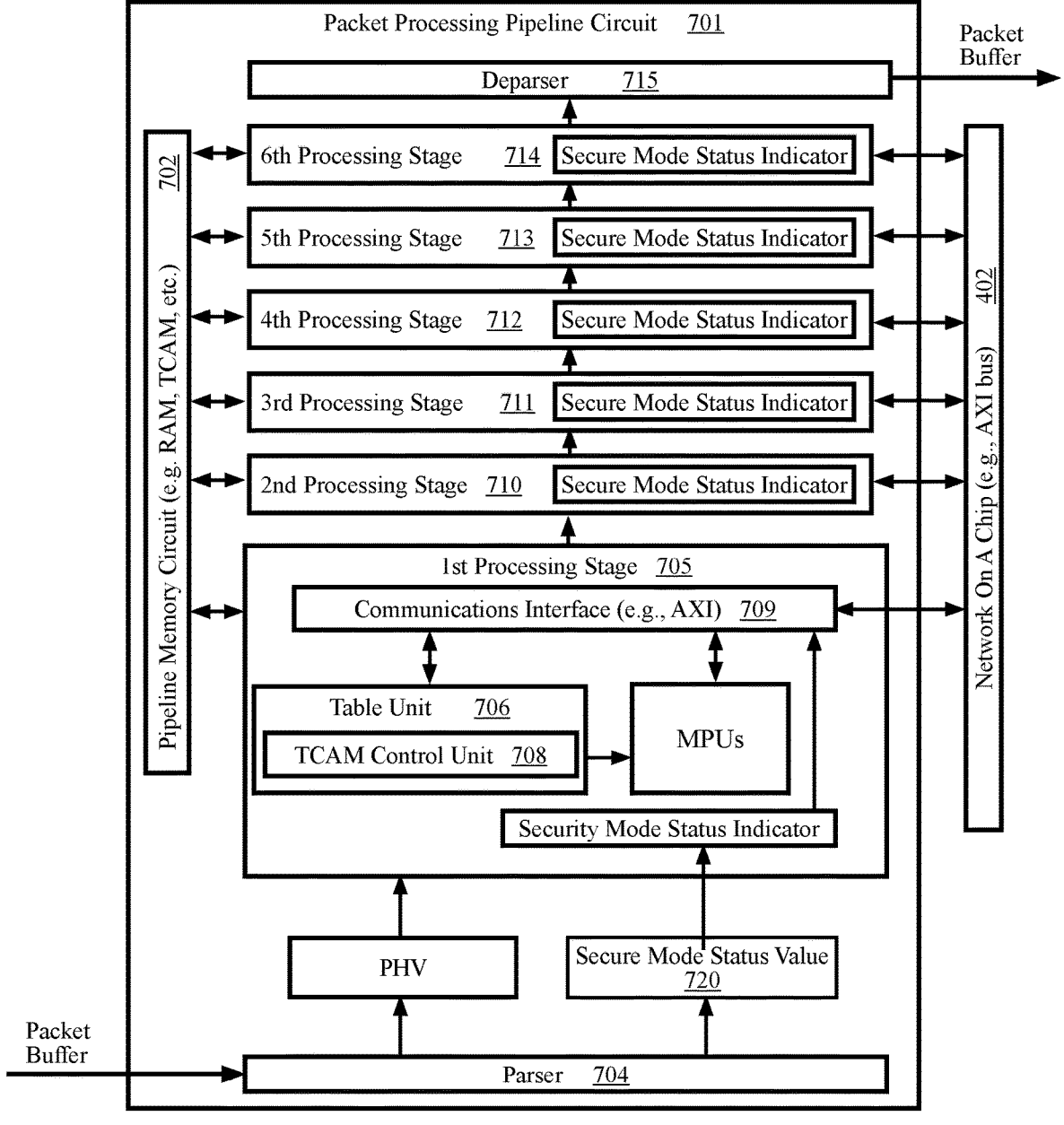
FIG. 7 illustrates a block diagram of a packet processing pipeline circuit that has stages that can operate in secure mode or insecure mode according to some aspects.

FIG. 7 illustrates a block diagram of a packet processing pipeline circuit 701 that has stages that can operate in secure mode or insecure mode according to some aspects. The packet processing pipeline circuit 701 may be included in the exemplary system of FIG. 4 as, for example, packet processing pipeline circuit 408. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and execution stages (i.e., match-action) that can be mapped onto the table units and MPUs. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through processing stages (e.g., processing stages 705, 710, 711, 712, 713, 714) of the match-action pipeline. Each processing stage can be configured to match one or more PHV fields to tables and to update the PHV, table entries, or other data according to the actions specified by the P4 program. If the required number of processing stages exceeds the implemented number of processing stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 has a P4 pipeline that can be implemented via a packet processing pipeline circuit 701.

The parser 704 can be an insecure hardware entity when it parses a packet received from outside the networking device. In such a case, the secure mode status value 720 produced by the parser and that is copied into the security mode status indicator of the first processing stage 705 indicates that the first processing stage 705 should run in insecure mode. A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the processing stages 705, 710, 711, 712, 713, 714 can be the same as the MPU 601 of FIG. 6. Processing stages can have any number of MPUs. The processing stages of a match-action pipeline can all be identical. The processing stages include security mode status indicators. The security mode status indicators may be the security mode status indicators in the MPU registers 606 or other registers in the processing stages.

A table unit 706 may be configured to support per-stage table match. For example, the table unit 706 may be configured to hash, lookup, and/or compare keys to table entries. The table unit 706 may be configured to control the address and size of the table, use PHV fields to generate a lookup key, and find Session Ids or MPU instruction pointers that define the P4 program associated with a table entry. A table result produced by the table unit can be an action indicator that is distributed to the multiple MPUs.

The table unit 706 can be configured to control a table selection. In some cases, upon entering a processing stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table unit 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a processing stage. The TCAM search index results may be forwarded to the table unit for SRAM lookups. The table unit 706 may be implemented by hardware or circuitry. The table unit may be hardware defined. In some cases, the results of table lookups or table results are provided to the MPU in its register file.

The table unit 706 and the MPUs can use a communications interface 709, such as an AXI bus interface to read and write data to other entities on the chip via a network on a chip 703 such as an AXI bus.

A match-action pipeline can have multiple processing stages such as the six processing stages illustrated in the example of FIG. 7. In practice, a match-action pipeline can have any number of processing stages. The processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow. Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by the ethernet ports 433 as a raw bit stream or transmitted by the ethernet ports 433 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 801, a layer 2 payload 802, and a layer 2 frame check sequence (FCS) 803. The layer 2 header can contain a source MAC address 805, a destination MAC address 804, an ethertype 807, and other layer 2 header data 808. The ethernet ports 433 of a networking device 430 can have MAC addresses. A networking device 430 can have a single MAC address that is applied to all or some of the ports. Alternatively, a networking device may have one or more ports that each have their own MAC address. In general, each port can send and receive packets. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors. The ethertype field is a two octet field in network packets such as IEEE 802.3 packets (ethernet) and IEEE 802.11 packets (WiFi). The ethertype of a packet is indicated by the ethertype value held in the ethertype field. The ethertype of a packet indicates which protocol is encapsulated in the layer 2 payload 802. The ethertype values used to identify the various protocols have been standardized by the Internet Engineering Task Force (IETF) and are widely published in networking literature.

The internet layer, often called layer 3, is the network layer where layer 3 packets can be routed from a first node to a second node across multiple intermediate nodes. The nodes can be networking devices such as networking device 201. Internet protocol (IP) is a commonly used layer 3 protocol. The layer 3 packet can have a layer 3 header 810 and a layer 3 payload 811. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 805 indicating the first node, a destination MAC address 804 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 805 indicating the intermediate node, a destination MAC address 804 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet can have a layer 4 header 820 and a layer 4 payload 821. The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. A layer 7 packet can have a layer 7 header 831 and a layer 7 payload 832. The illustrated layer 7 packet is an HTTP packet. The layer 7 header 831 is an HTTP header, and the layer 7 payload 832 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 9:
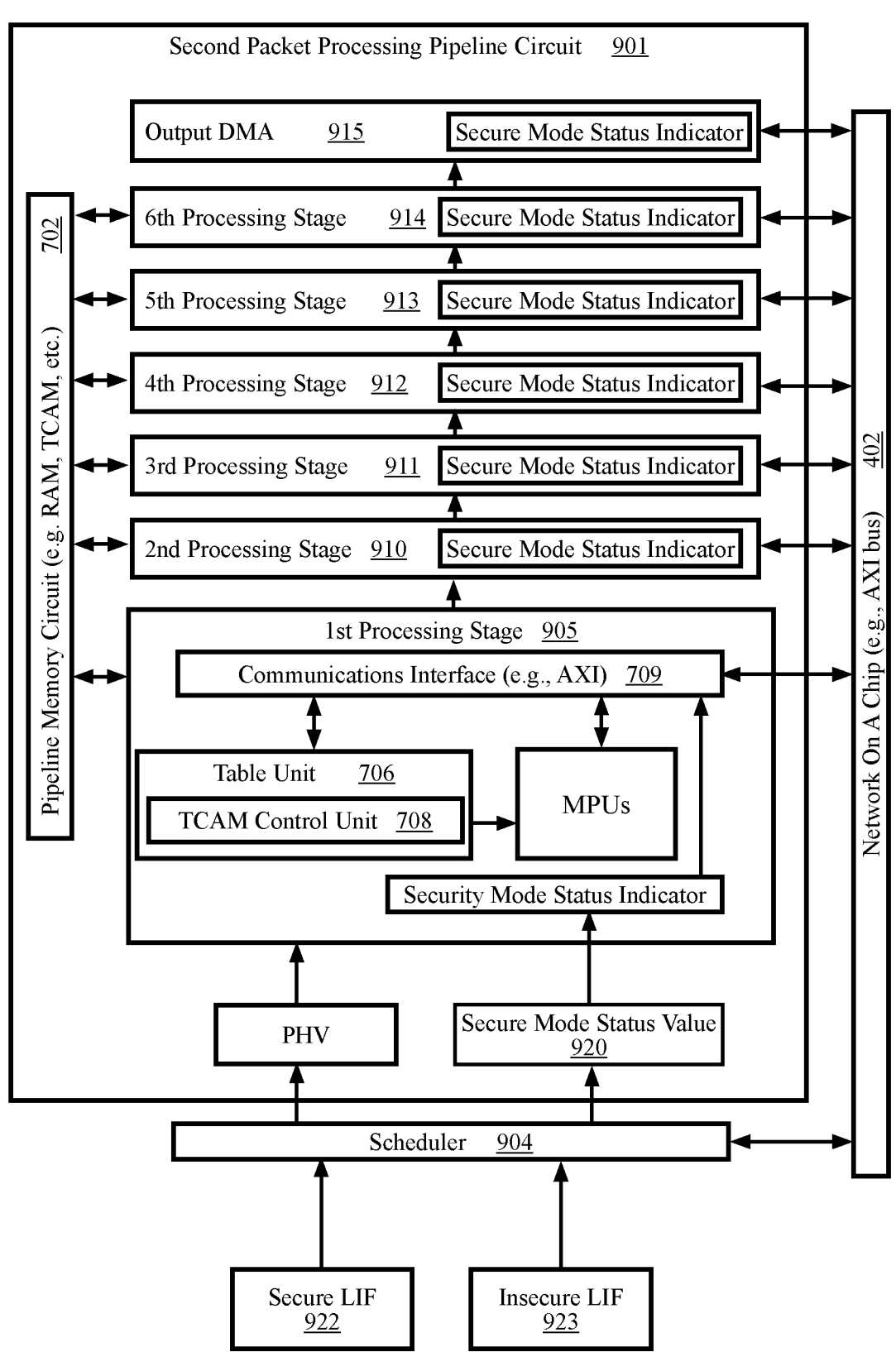
FIG. 9 illustrates a block diagram of a second packet processing pipeline circuit that has a scheduler at the input stage and direct memory access (DMA) at the output stage according to some aspects.

FIG. 9 illustrates a block diagram of a second packet processing pipeline circuit 901 that has a scheduler 904 at the input stage, a series of pipeline processing stages 905, 910, 911, 912, 913, 914, and an output direct memory access (DMA) stage 915 at the output stage according to some aspects. The second packet processing pipeline 901 illustrated in FIG. 9 may be the second packet processing pipeline 425 illustrated in FIG. 4. Each processing stage of the second packet processing pipeline 901 is a hardware entity that can perform tasks in secure mode or in insecure mode. The second packet processing pipeline 901 can process tasks that are submitted to a secure LIF 922 or to an insecure LIF 923. Only secure entities can submit tasks on the secure LIF 922. Insecure entities can submit tasks on the insecure LIF. Some implementations allow secure entities to submit tasks on the insecure LIF 923 because secure entities may be allowed to originate insecure operations. Other implementations prevent secure entities from submitting tasks on the insecure LIF 923 such that secure and insecure environments are completely separated.

Tasks may be submitted to the LIFs 922, 923 as PHVs. The PHVs can be PHVs for network packets or can be PHVs that indicate some type of processing other than network packet processing. For example, a management PHV can be submitted to a LIF such that the hardware entity performs administrative table DMA operations, entry aging functions, etc. Here, the scheduler is certified as secure and is capable of setting secure mode status indicators to indicate either secure mode or secure mode operation. When the scheduler takes a task from the secure LIF 922, the secure mode status value 920 written into the secure mode status indicator of the first processing stage 905 can indicate secure mode operation. When the scheduler takes a task from the insecure LIF 923, the secure mode status value 920 written into the secure mode status indicator of the first processing stage 905 can indicate insecure mode operation. The processing stages 905, 905, 910, 911, 912, 913, 914 of the second packet processing pipeline circuit 901 can be substantially similar to those of the packet processing pipeline circuit 701 illustrated in FIG. 7. The final stage of the second packet processing pipeline 901 can be an output DMA 915 stage that writes the result of the pipeline's processing into the memory 432.

Figures 10, 11:
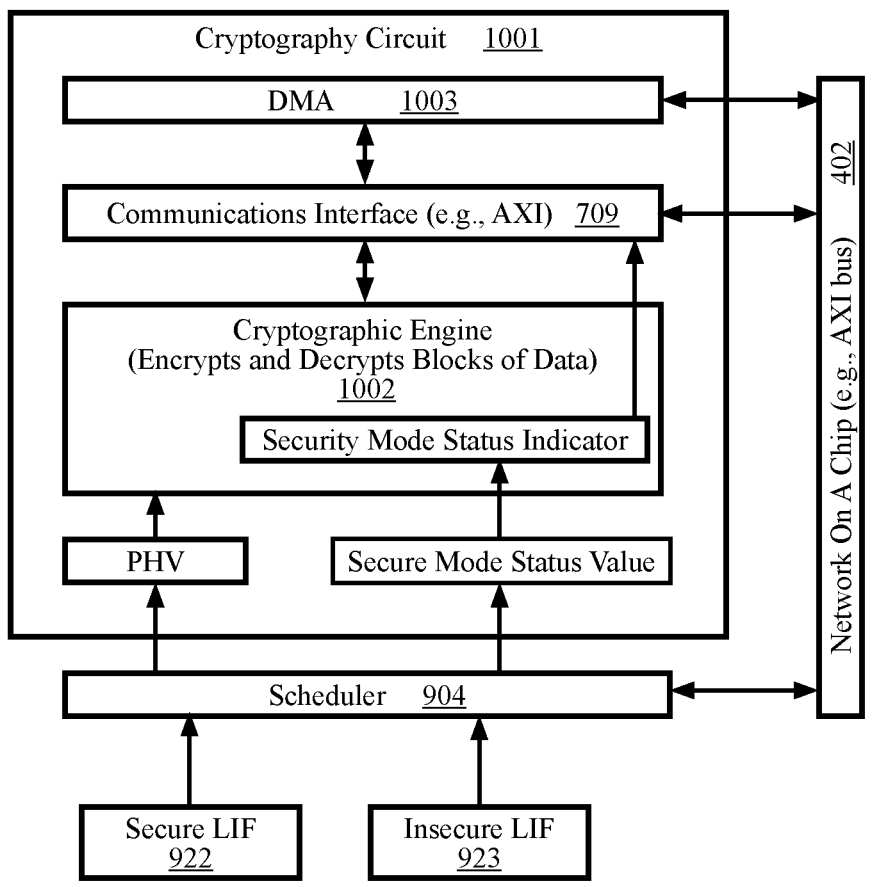
FIG. 10 is a high-level conceptual diagram illustrating a cryptography circuit that is a hardware entity that can operate in a secure mode or an insecure mode according to some aspects.
FIG. 11 is a high-level conceptual diagram of a PHV that commands a cryptography circuit to encrypt to decrypt a data block according to some aspects.

FIG. 10 is a high-level conceptual diagram illustrating a cryptography circuit 1001 that is a hardware entity that can operate in a secure mode or an insecure mode according to some aspects. The cryptography circuit 1001 illustrated in FIG. 10 may be the cryptography circuit 420 illustrated in FIG. 4. The cryptography circuit 1001 includes a DMA block 1003, a communications interface 709, and a cryptographic engine 1002. Tasks may be submitted to the LIFs 922, 923 as PHVs. The PHVs can be PHVs for block encryption commands or block decryption commands. Here, the scheduler is certified as secure and is capable of setting secure mode status indicators to indicate either secure mode or insecure mode operation. When the scheduler takes a task from the secure LIF 922, the secure mode status value 920 written into the secure mode status indicator of the cryptographic engine 1002 can indicate secure mode operation. When the scheduler takes a task from the insecure LIF 923, the secure mode status value 920 written into the secure mode status indicator of the cryptographic engine 1002 can indicate insecure mode operation.

FIG. 11 is a high-level conceptual diagram of a PHV 1101 that commands a cryptography circuit 1001 to encrypt to decrypt a data block according to some aspects. The PHV 1101 can include a data block source address, a processed block destination address, an encryption algorithm identifier, a data block size, a command identifier, a doorbell address, and miscellaneous flags. The data block source address can indicate the location of the data block that is to be encrypted or decrypted. The processed block destination address can indicate where the encrypted or decrypted block is to be written. The encryption algorithm identifier can indicate which encryption algorithm is to be used by the cryptographic engine 1002. The data block size can indicate the size of the data block in bytes, words, etc. The command identifier can be a unique identifier for the PHV or task. The doorbell address can indicate a doorbell to ring when the processing is complete.

The command to encrypt a data block can be submitted to the secure LIF 922. The scheduler can set the secure mode status indicator to indicate secure mode operation. As such, the cryptography circuit can use DMA 1003 to read the data block from the secure memory and can use the communications interface 709 to read the private key from the secure memory. The cryptographic engine 1002 then uses the private key to encrypt the data block. At this point, the cryptography circuit can erase the private key from its local storage and then transition from secure mode to insecure mode operation. Once operating in insecure mode, the cryptography circuit can use the DMA 1003 to write the encrypted block to the insecure memory before ringing the doorbell.

The command to decrypt a data block can be submitted to the insecure LIF 923. The scheduler can set the secure mode status indicator to indicate insecure mode operation. As such, the cryptography circuit can use DMA 1003 to read the encrypted data block from the insecure memory and can use the communications interface 709 to read the public key from the insecure memory. The cryptographic engine 1002 then uses the public key to decrypt the data block. The cryptography circuit can use the DMA 1003 to write the decrypted block to the insecure memory before ringing the doorbell.

Figure 12:
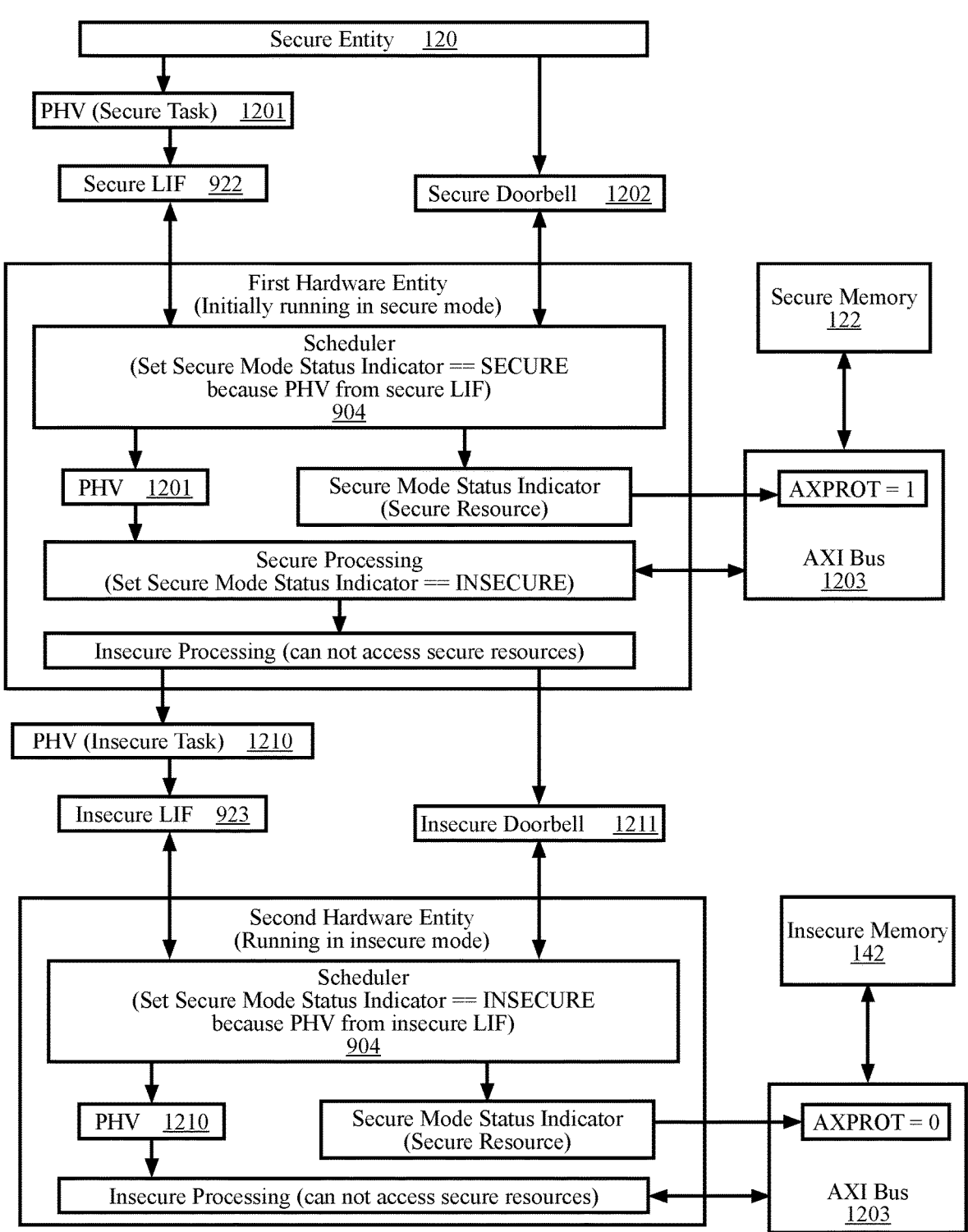
FIG. 12 is a high-level block diagram illustrating a secure task running on a first hardware entity that is in secure mode submitting an insecure task to a second hardware entity via an insecure logical interface (LIF) and an insecure doorbell according to some aspects.

FIG. 12 is a high-level block diagram illustrating a secure task running on a first hardware entity that is in secure mode submitting an insecure task to a second hardware entity via an insecure LIF 923 and an insecure doorbell 1211 according to some aspects. A secure entity 120 submits a PHV 1201 for a secure task to the secure LIF 922 and rings the secure doorbell 1202. Only secure entities are permitted to access secure LIFs and secure doorbells. The scheduler 904 obtains the PHV 1201 from the secure LIF 922, sets the secure mode status indicator of the first hardware entity to indicate secure, and submits the PHV 1201 for secure processing (a.k.a. processing in secure mode) by the first hardware entity. While processing in secure mode, the first hardware entity can set the ARPROT and AWPROT bits in an AXI bus interface to one and can thereby access secure memory 122 but cannot access insecure memory 142. One of the steps of secure processing can be to set the secure mode status indicator to indicate insecure processing. The first hardware entity is now running in insecure mode and can no longer set the ARPROT and AWPROT bits in the AXI bus interface to one and can no longer access secure memory 122 but can now access insecure memory 142. While running in insecure mode, the first hardware entity submits a PHV 1210 for an insecure task to an insecure LIF 923 and rings the insecure doorbell 1211.

Upon noticing the insecure doorbell 1211 has been rung, the scheduler 904 for the second hardware entity obtains the PHV 1210 from the insecure LIF 923, sets the secure mode status indicator of the second hardware entity to indicate insecure, and submits the PHV 1210 for insecure processing (a.k.a. processing in insecure mode) by the second hardware entity. While processing in insecure mode, the second hardware entity cannot set the ARPROT and AWPROT bits in an AXI bus interface to one and can thereby cannot access secure memory 122 but can access insecure memory 142.

The second hardware entity can perform the insecure task while running in insecure mode.

FIG. 13 is a high level flow diagram illustrating a method for running secure and insecure tasks on the same hardware entities according to some aspects. After the start, at block 1301 the method can receive a plurality of tasks at a first secure LIF or a first insecure LIF. At block 1302 the method can perform by a first hardware entity, the tasks that are submitted via the first secure LIF in a secure mode. At block 1303 the method can perform, by the first hardware entity, the tasks that are submitted via the first insecure LIF in an insecure mode. At block 1304 the method can access, by the first hardware entity, at least one of a plurality of secure resources while in the secure mode. At block 1305 the method can access, by the first hardware entity, at least one of a plurality of insecure resources while in the insecure mode, wherein a first security mode circuit in the first hardware entity sets the first hardware entity to the secure mode or to the insecure mode, and the first hardware entity cannot access the secure resources while operating in the insecure mode. At block 1306 the method can perform, by a second hardware entity, a second secure task that is submitted by the first hardware entity to a second secure LIF that is one of the secure resources, wherein the second hardware entity is configured to perform a plurality of additional tasks in the secure mode or in the insecure mode, and the second hardware entity performs the additional tasks that are submitted via the second secure LIF in the secure mode. At block 1307 the method can perform, by a second hardware entity, a second insecure task that is submitted by the first hardware entity to a second insecure LIF that is one of the insecure resources, wherein the second hardware entity is configured to perform a plurality of additional tasks in the secure mode or in the insecure mode, and the second hardware entity performs the additional tasks that are submitted via the second insecure LIF in the insecure mode.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The networking device may be implemented as a single IC device (e.g., fabricated on a single substrate) or the networking device may be implemented as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A system comprising:
a first hardware entity that includes a first security mode status indicator, the first hardware entity configured to operate in a secure mode in response to the first security mode status indicator indicating the secure mode and to operate in an insecure mode in response to the first security mode status indicator indicating the insecure mode; and
a plurality of secure resources that include a first secure logical interface (LIF) configured to receive only secure tasks for the first hardware entity;
a plurality of insecure resources that include a first insecure LIF configured to receive only insecure tasks for the first hardware entity;
wherein:
the first hardware entity is configured to perform the secure tasks received via the first secure LIF only when the first security mode status indicator indicates the secure mode; and
the first hardware entity is configured to perform the insecure tasks received via the first insecure LIF only when the first security mode status indicator indicates the insecure mode.

2. The system of claim 1, wherein:
the first hardware entity is configured to access the secure resources and the insecure resources when the first security mode status indicator indicates the secure mode.

3. The system of claim 1, further including:
a second hardware entity that includes a second security mode status indicator, the second hardware entity configured to operate in the secure mode in response to the second security mode status indicator indicating the secure mode and to operate in the insecure mode in response to the second security mode status indicator indicating the insecure mode, wherein:
the secure resources include a second secure LIF configured to only receive secure tasks;
the first hardware entity is configured to submit a second secure task to the second hardware entity via the second secure LIF in response to receiving a first secure task; and
the second hardware entity is configured to perform the second secure task only when the second security mode status indicator indicates the secure mode.

4. The system of claim 3, further wherein:
the insecure resources include a second insecure LIF;
the first hardware entity is configured to submit a second insecure task to the second hardware entity via the second insecure LIF in response to receiving a first insecure task; and
the second hardware entity is configured to perform the second insecure task only when the second security mode status indicator indicates the insecure mode.

5. The system of claim 3, further including:
a packet processing pipeline circuit configured to use a plurality match action units to process a plurality of network packets,
wherein the first hardware entity is one of the match action units and the second hardware entity is another one of the match action units.

6. The system of claim 1, wherein:
the first hardware entity is configured to allow a secure task to change the first security mode status indicator and to never allow an insecure task to change the first security mode status indicator; and
changing the first security mode to indicate the insecure mode while the first hardware entity is performing the secure task changes the secure task into an insecure task.

7. The system of claim 1, wherein:
the first hardware entity performs a secure task by executing a plurality of secure task executable instructions that are stored in a secure memory that is one of the secure resources; and
the first hardware entity performs an insecure task by executing a plurality of insecure task executable instructions that are stored in an insecure memory that is one of the insecure resources.

8. The system of claim 1, wherein:
the secure resources include a secure memory that stores secure task data that is accessed by the first hardware entity while performing a secure task submitted via the first secure LIF; and
the insecure resources include an insecure memory that stores insecure task data that is accessed by the first hardware entity while performing an insecure task submitted via the first insecure LIF.

9. The system of claim 1, wherein the first hardware entity is a cryptography circuit.

10. The system of claim 1, further including a secure entity that submits a secure task to the first hardware entity via the first secure LIF.

11. The system of claim 1, wherein:
submitting a secure task to the first hardware entity includes writing into a secure doorbell that is one of the secure resources; and
submitting an insecure task to the first hardware entity includes writing into an insecure doorbell that is one of the insecure resources.

12. The system of claim 1, further including:

an advanced extensible interface (AXI) bus that supports secure access protections, wherein the secure access protections prevent an insecure task from accessing a secure memory that is one of the secure resources, and the secure access protections allow a secure task to access the secure memory.

13. The system of claim 12, wherein:

the first secure LIF is mapped into the secure memory;

the secure access protections prevent a hardware entity from accessing the secure LIF while operating in the insecure mode and allow the hardware entity to access the secure LIF while operating in the secure mode.

14. The system of claim 1, wherein:

setting the first security mode status indicator to a first value sets the first hardware entity to the secure mode; and setting the first security mode status indicator to a second value sets the first hardware entity to the insecure mode.

* * * * *